Dec. 25, 1928.
L. E. WACKERLE
1,696,871
TABLE OR STAND
Filed May 3, 1927
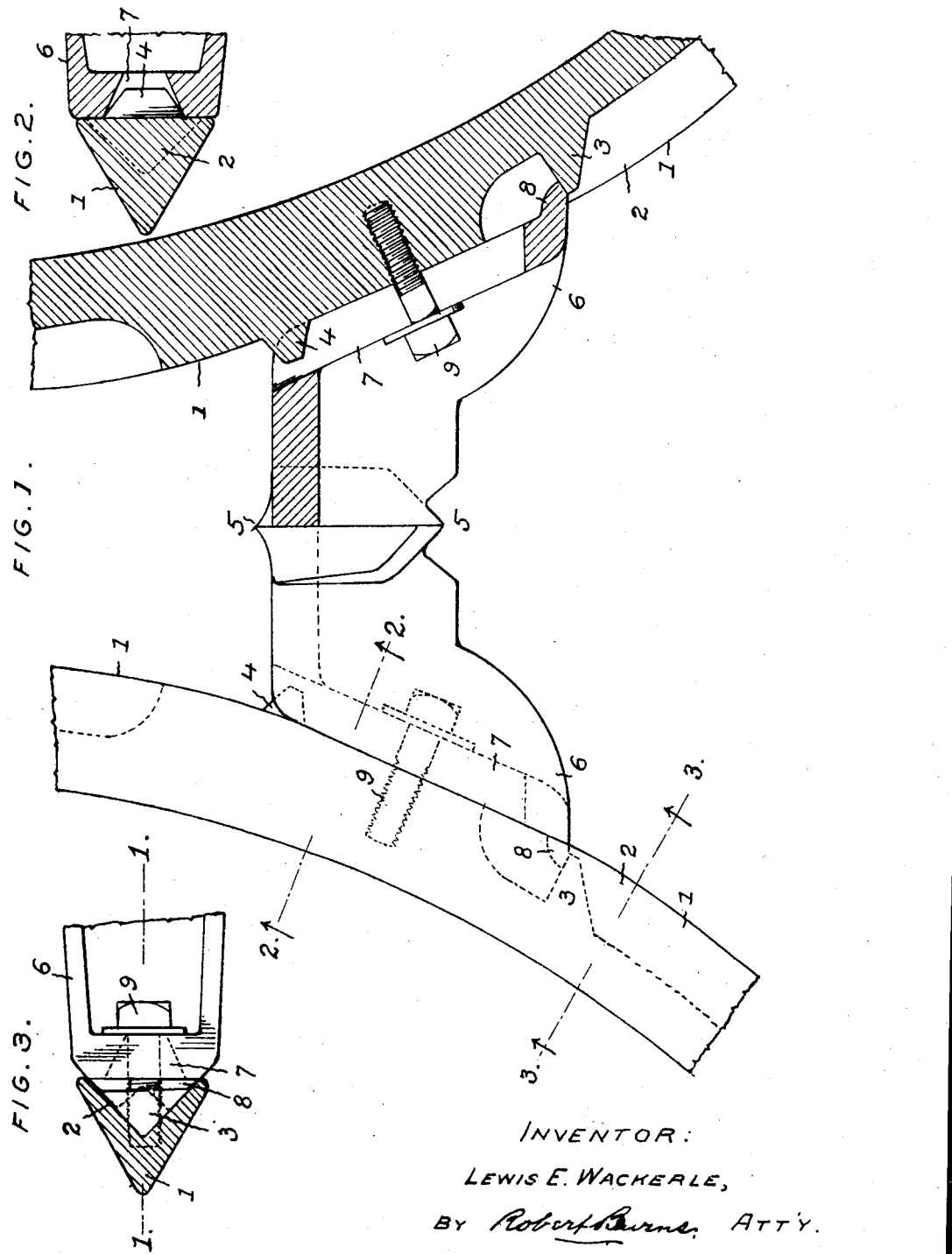
INVENTOR:
LEWIS E. WACKERLE,
BY Robert Burns, ATT'Y.

Patented Dec. 25, 1928.

1,696,871

UNITED STATES PATENT OFFICE.

LEWIS E. WACKERLE, OF WAUKEGAN, ILLINOIS, ASSIGNOR TO CHICAGO HARDWARE FOUNDRY COMPANY, OF NORTH CHICAGO, ILLINOIS, A CORPORATION OF ILLINOIS.

TABLE OR STAND.

Application filed May 3, 1927. Serial No. 188,506.

This invention relates to that type of tables or stands in which a plurality of supporting legs are fixedly connected together at their mid-height by a central brace or connecting member and the present improvement has for its object:

To provide a structural formation and association whereby a rigid and substantial attachment of a plurality of table legs to a central connecting and bracing member is attained in a simple and effective manner, all as will hereinafter more fully appear.

In the accompanying drawing:

Fig. 1, is a view, one-half in elevation and one-half in vertical section on line 1—1, Fig. 2, of the middle portion of a pair of table legs and connecting member to which the preferred form of the invention is applied.

Figs. 2 and 3, are detail horizontal sections, on line 2—2, and 3—3, respectively, Fig. 1.

Like reference numerals indicate like parts in the different views.

In the present construction, the table legs are preferably of a curved or segmental form and of a triangular shape in cross section as shown. And in the present improvement the inner or rear face of each leg is formed with a recess or channel 2 preferably of a V shape in which is formed a cross lug or web 3 integral with the leg 1, with the upper surface of such lug or web 3 affording a bearing or abutment for a complementary lug on the hereinafter described central brace member 5. In spaced relation the lug or web 3, the table leg 1 is also formed with a rearwardly extending lug 4, the respective side faces of which are beveled to afford a positioning fit in a receiving recess in the central brace member 5 now to be described.

The central brace member 5 is preferably of an open bottom shell form, and is formed with a plurality of radial wings or extensions 6, corresponding in number with the number of leg members 1, used in the make up of the table standard or support, and with each of said wings formed with a recess or slot 7, along its height. The upper end of said slot 7 is of an open formation and is adapted to engage the aforesaid lug 4 of a table leg 1, as shown in Figs. 1 and 3, while the lower end of said slot is closed by a lug or web 8, extending outward from the face of the wing or extension 6 and adapted to rest and have bearing upon the aforesaid lower cross lug 3 of the table leg 1, as shown in Figs. 1 and 2.

Passing through the slot or recess 7 of each wing 6 of the center brace 5, and adjacent to the mid-height of the same, is a headed screw bolt 9, the shank of which screws into a screw threaded orifice formed therefor in a table leg 1, to provide a substantial and simple means of clamping the parts together in an assemblage thereof.

Having thus fully described my invention what I claim and desire to secure by Letters Patent, is:—

1. In a table or the like, the combination of a plurality of legs, a central brace member formed with radial wings corresponding in number to said legs, each leg having upper and lower lugs in spaced relation, and each radial wing of the brace member having a channel or slot in its outer face for engagement with the upper lug of the leg and a bearing lug at its lower end for abutment against the lower lug of the leg, and a headed screw bolt arranged intermediate the height of a radial wing and adapted to draw and fixedly hold the parts together.

2. In a table or the like, the combination of a plurality of legs, each leg being of a curved form and provided with an upper lug on its rear surface, with a channel in said rear surface and with a cross lug in said channel, said lugs being in separated relation, a central brace member having radial wings, with each wing formed with a channel or slot in its outer face for engagement with the upper lug of the leg, and a bearing lug at its lower end for abutment against the lower lug of the leg, and a headed screw bolt arranged intermediate of said lugs and adapted to draw and fixedly hold the parts together.

3. In a table or the like, the combination of a plurality of legs, each leg being of a curved form and provided with an upper lug on its rear surface, with a channel in said rear surface and with a cross lug in said channel, said lugs being in separated relation, a central brace member of an open bottom shell form formed with radial wings with each wing formed with a channel or slot in its outer face for engagement with the upper lug of the leg and a bearing lug at its lower end for abutment against the lower lug of the leg and a headed screw bolt arranged intermediate of said lugs and adapted to draw and fixedly hold the parts together.

Signed at North Chicago, Illinois, this 30th day of April, 1927.

LEWIS E. WACKERLE.